US011665525B2

(12) United States Patent
Kumar et al.

(10) Patent No.: US 11,665,525 B2
(45) Date of Patent: May 30, 2023

(54) METHOD AND APPARATUS FOR RECOVERING FROM STEERING OF ROAMING RELATED FAILURES

(71) Applicant: Samsung Electronics Co., Ltd., Suwon-si (KR)

(72) Inventors: Anikethan Ramakrishna Vijaya Kumar, Bangalore (IN); Lalith Kumar, Bangalore (IN); Kundan Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 16/993,105

(22) Filed: Aug. 13, 2020

(65) Prior Publication Data

US 2021/0051466 A1 Feb. 18, 2021

(30) Foreign Application Priority Data

Aug. 13, 2019 (IN) .............................. 201941032691
Jul. 21, 2020 (IN) .............................. 201941032691
Aug. 11, 2020 (KR) ........................ 10-2020-0100746

(51) Int. Cl.
*H04W 8/12* (2009.01)
*H04W 76/27* (2018.01)
*H04W 48/18* (2009.01)
*H04W 60/00* (2009.01)
*H04W 84/04* (2009.01)

(52) U.S. Cl.
CPC ............. *H04W 8/12* (2013.01); *H04W 48/18* (2013.01); *H04W 60/00* (2013.01); *H04W 76/27* (2018.02); *H04W 84/042* (2013.01)

(58) Field of Classification Search
CPC ....... H04W 8/12; H04W 76/27; H04W 48/18; H04W 60/00; H04W 84/042
USPC ........................................................ 370/329
See application file for complete search history.

(56) References Cited

U.S. PATENT DOCUMENTS

| 2013/0109377 A1* | 5/2013 | Al-Khudairi | ......... H04W 48/16 455/432.1 |
| 2019/0268752 A1* | 8/2019 | Buckley | ................ H04W 12/06 |
| 2020/0084741 A1* | 3/2020 | Chun | .................... H04W 48/02 |

FOREIGN PATENT DOCUMENTS

WO 2014036144 A2 3/2014

OTHER PUBLICATIONS

3GPP TS 23.122 V16.2.0 (Jun. 2019) (Year: 2019).*
3GPP TSG-CT WG1 Meeting #117 C1-193118 (May 2019) (Year: 2019).*
3GPP TSG-CT WG1 Meeting #117 C1-193117 (May 2019) (Year: 2019).*

(Continued)

*Primary Examiner* — William Nealon

(57) ABSTRACT

Methods and systems for recovering from SOR failures are provided. A method performed by a user equipment (UE) in a wireless communication system, the method comprises detecting a steering of roaming (SOR) failure during registering with a first visitor-public land mobile network (VPLMN) or after registration with the first VPLMN, wherein the UE operates in a manual mode; switching the manual mode to an automatic mode based on a determination that the SOR failure occurs; and performing PLMN selection procedure to obtain service on a second VPLMN which is a higher priority than the first VPLMN.

14 Claims, 10 Drawing Sheets

(56) References Cited

OTHER PUBLICATIONS

International Search Report and Written Opinion of the International Searching Authority in connection with International Application No. PCT/KR2020/010660 dated Nov. 3, 2020, 9 pages.
European Search Report in connection with European Application No. 20190799.5 dated Jan. 26, 2021, 13 pages.
ETSI TS 123 122 V15.7.0 (Apr. 2019), Technical Specification, Apr. 2019, Digital cellular telecommunications system (Phase 2+) (GSM); Universal Mobile Telecommunications System (UMTS); LTE; Non-Access-Stratum (NAS) functions related to Mobile Station (MS) in idle mode (3GPP TS 23.122 version 15.7.0 Release 15), 68 pages.
Huawei, et al., "Emergency service handling for SOR," C1-193298, 3GPP TSG-CT WG1 Meeting #117, Reno (NV), USA, May 13-17, 2019, 12 pages.
NTT DOCOMO, "Enhancement to SOR in connected mode," C1-191229, revision of C1-190097, 3GPP TSG CT WG1 Meeting #114, Bratislava, Slovakia, Jan. 21-25, 2019, 11 pages.
NTT DOCOMO, "Updating SOR procedures to align with stage-3," C1-193117, 3GPP TSG-CT WG1 Meeting #117, Reno (NV), USA, May 13-17, 2019, 13 pages.
NTT DOCOMO, "Updating SOR procedures to align with stage-3," C1-193118, 3GPP TSG-CT WG1 Meeting #117, Reno (NV), USA, May 13-17, 2019, 14 pages.
Samsung, "Handling of SOR failure encountered in Manual mode of operation," C1-194abc, 3GPP TSG-CT WG1 Meeting #119, Wroclaw (Poland), Aug. 26-30, 2019, 6 pages.
Communication under Rule 71(3) EPC dated Nov. 9, 2022 in connection with European Patent Application No. 20 190 799.5, 57 pages.

\* cited by examiner

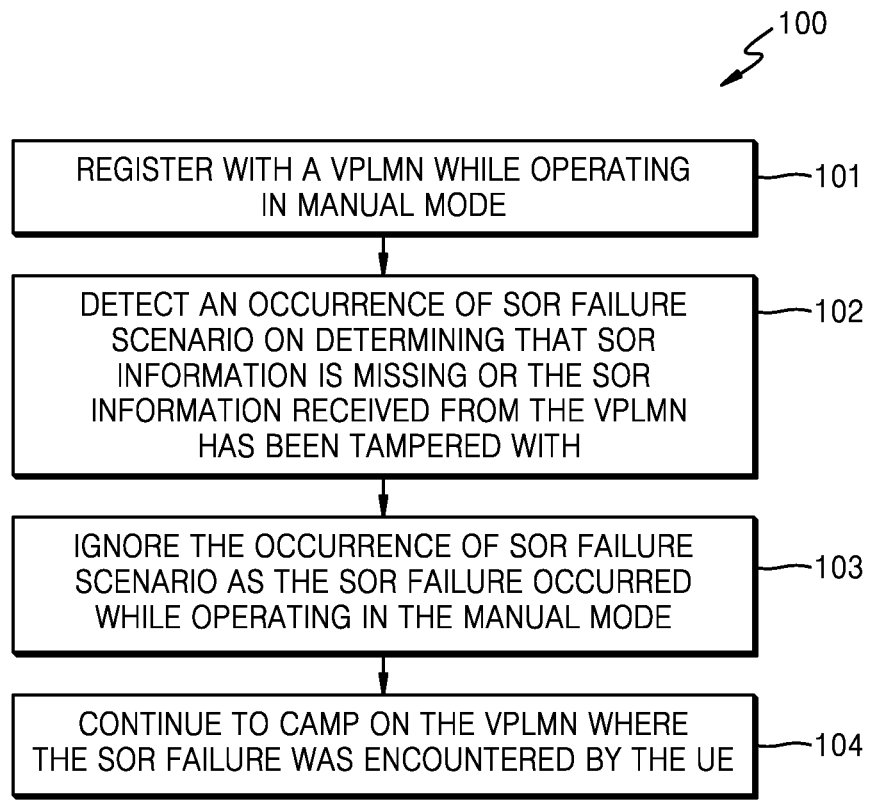

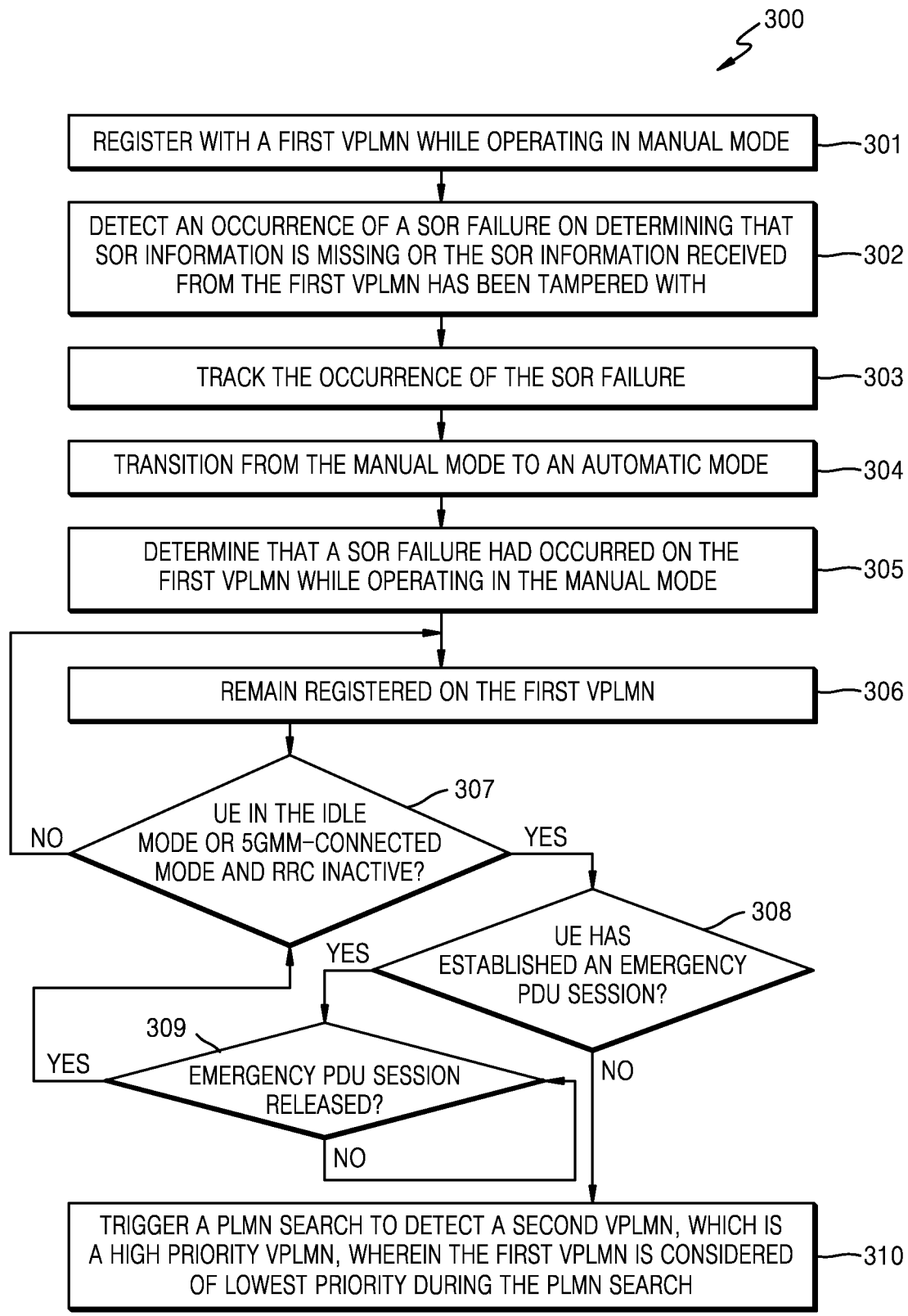

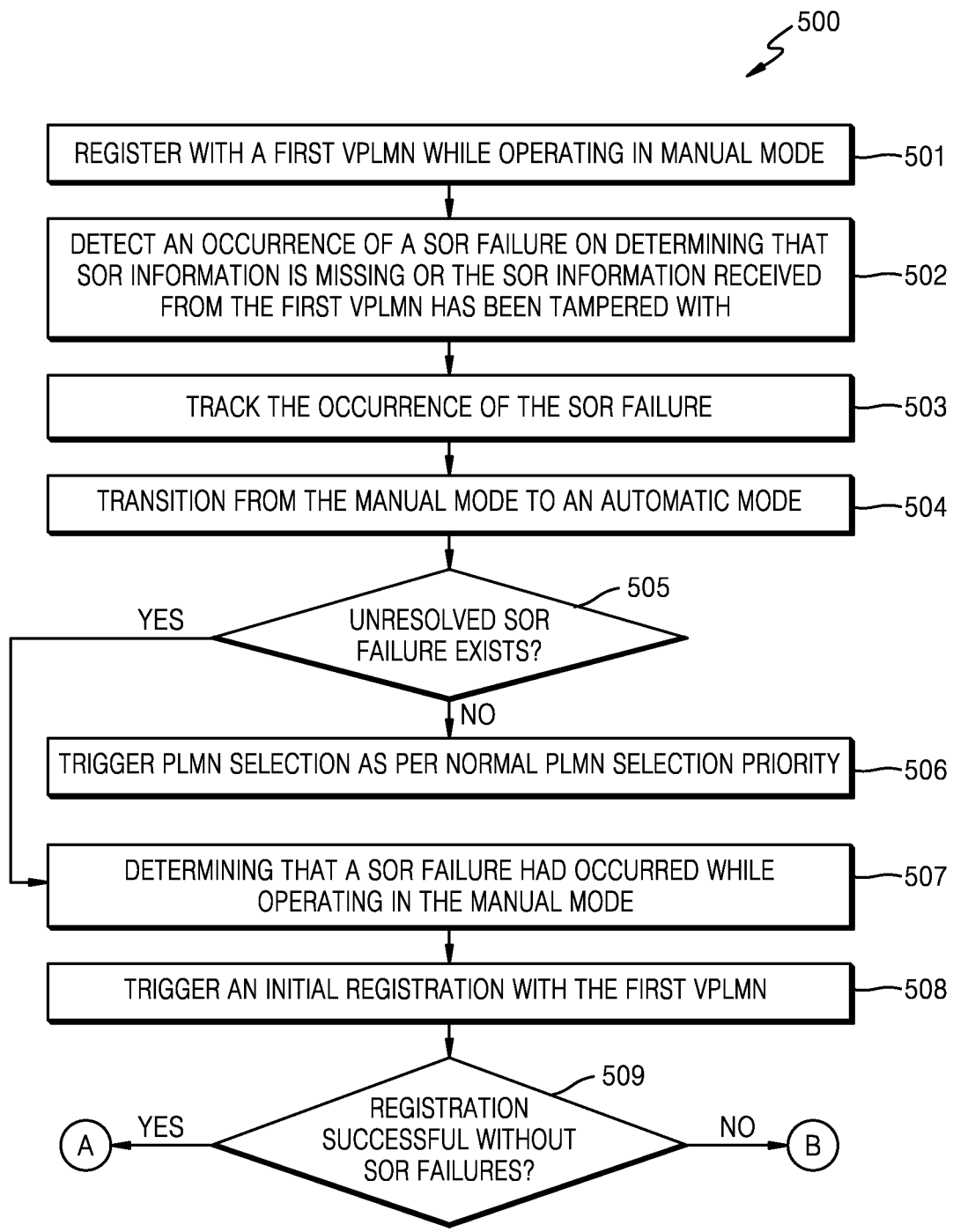

METHOD AND APPARATUS FOR RECOVERING FROM STEERING OF ROAMING RELATED FAILURES

CROSS REFERENCE TO RELATED APPLICATION

This application is based on and claims priority under 35 U.S.C. § 119(a) of Indian Provisional Application 201941032691 filed on Aug. 13, 2019, Indian Complete Application 201941032691 filed on Jul. 21, 2020, and Korean Application 10-2020-0100746 field on Aug. 11, 2020, the contents of which are incorporated herein by reference.

BACKGROUND

1. Field

Embodiments herein relate to fifth generation (5g) wireless communication networks, and more particularly to methods and systems for enabling recovery from steering of roaming (SOR) related failures in 5G wireless communication networks.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a "beyond 4G network" or a "post long term evolution (LTE) system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

In an embodiment, a method for handling steering of roaming (SOR) failure by a user equipment (UE) in a fifth generation (5G) wireless network is provided. The method comprising: detecting, by the UE, a SOR failure from a first visitor-public land mobile network (VPLMN), wherein the UE is registered with the first VPLMN and the UE is operating in a manual mode; remembering, by the UE, the detected SOR failure while operating in the manual mode in the first VPLMN; and resolving, by the UE, the SOR failure on switching to an automatic mode from the manual mode while the UE is registered with the first VPLMN where the SOR failure was detected.

In an embodiment, where in the SOR failure is detected by the UE on occurrence of at least one event comprising: non-reception of SOR information in an initial registration accept message, wherein the UE is configured to receive SOR information in the initial registration accept message; and a security check performed on a received SOR information is not successful, wherein the security check is not successful due to tampering of the received SOR information.

In an embodiment, wherein the SOR failure is resolved by the UE by triggering a public land mobile network (PLMN) search on switching to the automatic mode, wherein the PLMN search involves the UE attempting to obtain service from a high priority VPLMN, after the UE moves to one of an IDLE state and an radio resource control (RRC)-INACTIVE state, wherein the first VPLMN is considered as a low priority VPLMN during the PLMN search.

In an embodiment, wherein the PLMN search is triggered if there is (are) no emergency protocol data unit (PDU) session(s) active in the UE.

In an embodiment, a user equipment (UE) for handling steering of roaming (SOR) failure in a fifth generation (5G) wireless network, the UE configured to: detect an SOR failure from a first visitor-public land mobile network (VPLMN), wherein the UE is registered with the first VPLMN and the UE is operating in a manual mode; remember the detected SOR failure while operating in the manual mode in the first VPLMN; and resolve the SOR failure on switching to an automatic mode from the manual mode while the UE is registered with the first VPLMN where the SOR failure was detected.

In an embodiment, where in the SOR failure is detected by the UE on occurrence of at least one event comprising: non-reception of SOR information in an initial registration accept message, wherein the UE is configured to receive SOR information in the initial registration accept message; and a security check performed on a received SOR information is not successful, wherein the security check is not successful due to tampering of the received SOR information.

In an embodiment, wherein the SOR failure is resolved by the UE by triggering a public land mobile network (PLMN) search on switching to the automatic mode, wherein the PLMN search involves the UE attempting to obtain service from a high priority VPLMN, after the UE moves to one of an IDLE state and an radio resource control (RRC)-INACTIVE state, wherein the first VPLMN is considered as a low priority VPLMN during the PLMN search.

In an embodiment, wherein the PLMN search is triggered if there is (are) no emergency protocol data unit (PDU) session(s) active in the UE.

In an embodiment, a method performed by a user equipment (UE) in a wireless communication system is provided. The method comprising: detecting a steering of roaming (SOR) failure during registering with a first visitor-public land mobile network (VPLMN) or after registration with the first VPLMN, wherein the UE operates in a manual mode; switching the manual mode to an automatic mode based on a determination that the SOR failure occurs; and performing PLMN selection procedure to obtain service on a second VPLMN which is a higher priority than the first VPLMN.

In an embodiment, wherein if the first VPLMN is a PLMN which the SOR failure occurs, the first VPLMN is considered as the lowest priority during performing the PLMN selection procedure.

In an embodiment, wherein the UE is still registered on the first VPLMN where the SOR failure occurs upon switching the manual mode to an automatic mode.

In an embodiment, wherein the PLMN selection procedure is performed after an emergency PDU session is released in case the UE has an established emergency PDU session.

In an embodiment, the method further comprises: receiving, from the first VPLMN, a registration accept message which includes SOR information during registering with the first VPLMN; and wherein the SOR failure is detected based on the registration accept message.

In an embodiment, wherein it is determined that the SOR failure occurs in case that the SOR information is missing in the registration accept message or security check fails of the SOR information during registering with the first VPLMN.

In an embodiment, the method further comprises operating in an IDLE mode or RRC-INACTIVE mode before performing the PLMN selection procedure.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 illustrates a flowchart of a method for ignoring a steering of roaming (SOR) related failure, encountered by a user equipment (UE) while operating in a manual mode and hence not taking any recovery action when the UE switches to automatic mode of operation;

FIG. 3 illustrates a flowchart of a method for recovering from a SOR failure, wherein the procedure triggers a PLMN search to detect a high priority second VPLMN and successfully register with the second VPLMN, for receiving SOR information from the second VPLMN, according to embodiments as disclosed herein;

FIGS. 5A and 5B illustrates a flowchart of a recovering method from the SOR failure, wherein the procedure triggers an initial registration with a first VPLMN, in order to receive SOR information from the first VPLMN, according to embodiments as disclosed herein.

DETAILED DESCRIPTION

Figure 2A:
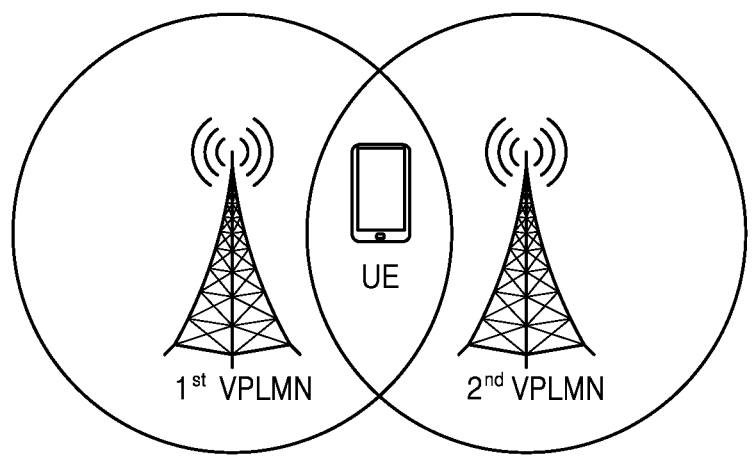
FIG. 2A illustrates an example scenario, wherein a UE is camped on a first visitor-public land mobile network (VPLMN) and the UE is configured to recover from SOR related failures by receiving SOR information from either the first VPLMN or a second VPLMN according to embodiments as disclosed herein.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The principal object of the embodiments herein is to disclose methods and systems for providing mechanisms to enable a user equipment (UE), operating in manual mode, camped on a visitor-public land mobile network (VPLMN), to recover from steering of roaming (SOR) related failures, wherein the recovery mechanisms can be triggered by the UE when the UE transitions from a manual mode to an automatic mode while remaining camped on the VPLMN where the SOR failure was detected.

Another object of the embodiments herein is to track SOR related failures, encountered by the UE when the UE is operating in the manual mode.

Another object of the embodiments herein is to initiate recovery procedures for overcoming from the SOR related failures when the UE switches to the automatic mode while remaining camped on the VPLMN where the SOR failure was detected, if the UE does not receive authentic SOR information while operating in the manual mode.

Another object of the embodiments herein is to trigger initial registration with the VPLMN for recovering from the SOR related failures on the UE switching to the automatic mode from the manual mode; wherein the UE can recover from the SOR related failures if the initial registration is successful and if the UE receives the authentic SOR information during the registration.

Another object of the embodiments herein is to trigger a PLMN search procedure to detect at least one other VPLMN and register with a VPLMN, for recovering from the SOR related failures, when the UE switches to the automatic mode from the manual mode while remaining camped on the VPLMN where the SOR failure was detected; wherein, during the PLMN search, the VPLMN, on which SOR related failure occurred, is considered as the least preferred VPLMN; wherein the UE can recover from the SOR related failures if the registration is successful and if the UE receives the authentic SOR information during the registration.

Another object of the embodiments herein is to periodically trigger the PLMN search procedure, to recover from the SOR related failures, if the UE (while the SOR related failure was encountered by the UE while operating in the manual mode), operating in the automatic mode, is unable to register with another VPLMN and has to camp on the VPLMN where the SOR related failure was encountered.

Accordingly, the embodiments herein provide methods and systems for recovering from steering of roaming (SOR) related failures. The embodiments include detecting SOR related failures, when the user equipment (UE) is operating in a manual mode. The embodiments include tracking the occurrences of SOR related failures detected by the UE operating in the manual mode. The embodiments include storing the identities of visitor-public land mobile networks (VPLMNs), with which the SOR related failures have been detected by the UE.

In an embodiment, the UE can track occurrences of the SOR related failures using a flag. The status of the flag can indicate whether the UE, operating in the manual mode, had encountered a SOR related failure when the UE is camped on a first VPLMN. The UE can set the flag if the UE encounters a SOR failure. The flag can be reset when the SOR failure is resolved.

In an embodiment, the UE can track the occurrences of the SOR related failures using a list, which includes VPLMNs, with which the UE had encountered SOR related failures, when the UE was operating in the manual mode. In an embodiment, the existing list "PLMNs where registration was aborted due to SOR" can be reused for identifying the VPLMNs, with which the SOR related failures had been encountered by the UE, when the UE was operating in the manual mode. The list can be cleared if the SOR failure is resolved.

The embodiments include resolving the SOR failure by receiving accurate SOR information. The SOR information can be received by the registering with a VPLMN. The UE can trigger an initial registration with the first VPLMN, when the UE switches from manual mode to automatic mode. If the UE receives the SOR information and if the SOR information is decoded without any failures from the first VPLMN (here first VPLMN is the PLMN on which the UE was registered in manual mode and on which SOR failure has been encountered), the initial registration is considered as successful and the SOR failure is resolved. In another embodiment, instead of using the procedure of initial registration to refresh the SOR information, the UE can attempt a PLMN search and attempt to find a second VPLMN, i.e., a high priority VPLMN. During the search the UE is camped on the first VPLMN where the SOR failure was detected. The UE can register with the second VPLMN after detecting the second VPLMN. The PLMN search can be triggered when the UE switches to the automatic mode. If the registration is successful, wherein the UE receives the SOR information from the second VPLMN, and if the received SOR information is decoded without any failures, and the SOR failure is considered resolved.

The embodiments include checking whether the SOR information has been received after registering with the first VPLMN and/or second PLMN. If the SOR information has not been received after the registration, the flag remains set, and/or the list continues to be populated with entries of the PLMNs on which SOR failure has occurred. If the SOR information is received after the new registration and if the security check performed on the received SOR information is successful, the flag can be reset, and/or the first VPLMN can be depopulated from the list. If the UE registers with the second VPLMN and does not receive the SOR information or if a security check performed on the SOR information fails, the second PLMN can be de-prioritized. Thereafter, the UE can initiate a PLMN search to detect other allowed PLMNs, which are available. This sequence of searching and attempting on the allowed PLMN can continue, and based on the outcome of the reception/decoding of SOR information, the same set of actions defined previously for the first and second VPLMN can be executed for other PLMNs. If no allowed PLMN's other than the ones where SOR failure has occurred are found, the UE registers with the first VPLMN or any of the other PLMN's where SOR failure has occurred, and periodically triggers a PLMN search in order to detect a high priority VPLMN and register with the VPLMN to receive the SOR information.

The embodiments include initializing a back-off timer to control the frequency of triggering the PLMN search. The UE can prevent procedures, which can initiate a PLMN search to recover from the SOR failure, prior to the expiry of the back-off timer.

Embodiments herein provide methods and systems for recovering from steering of roaming (SOR) related failures. The embodiments include enabling a user equipment (UE), camped on a visitor-public land mobile network (VPLMN), to recover from SOR related failures, which have been encountered by the UE while operating in a manual mode or an automatic mode. Referring now to the drawings, and more particularly to FIGS. 1 through 7, where similar reference characters denote corresponding features consistently throughout the figures, there are shown preferred embodiments.

Steering of roaming (SOR) feature is used by network operators for ensuring that a home-public land mobile network (HPLMN) is able to steer a subscriber to a most preferred visitor-PLMN (VPLMN) for a given location. The can be accomplished by providing to a user equipment (UE) (i.e., the device being used by the user), a list of preferred VPLMNs in that location, i.e., SOR information; and the UE camping on to one of the preferred VPLMNs. However, the HPLMN needs to route the SOR information to the UE through the VPLMN, on which the UE is currently registering/registered.

However, there can be SOR failure scenarios, such as the VPLMN (on which the UE is currently camped) not providing the list of preferred VPLMNs to the UE, the VPLMN (on which the UE is currently camped) providing the list of preferred VPLMNs to the UE with incorrect contents, and so on. This may occur to ensure that the UE remains camped on the VPLMN. Camping on a least/not preferred PLMN can lead to loss of revenue for the HPLMN due to higher operational cost for the HPLMN and loss for the subscriber due to higher service charges.

In order to overcome SOR failure scenarios, additional requirements for detecting SOR failure and recovering from the SOR failure scenarios, have been formalized in the 3rd generation partnership project (3GPP) specification, technical standard (TS) 23.122, release 15 for 5th generation (5G) communication. Some of the requirements that have been defined are: making it mandatory to receive SOR related information by the UE during initial registration with a VPLMN, and protect the integrity of the SOR related information such that only the HPLMN-unified data management (HPLMN-UDM) and the UE can encode/decode the SOR related information. This allows the UE to detect any tampering/removal of the SOR information by the VPLMN node in any non-access stratum (NAS) message to the UE. In case of the UE detecting the absence of SOR related information or tampering of SOR related information; the UE can activate recovery mechanisms, which have been defined to allow the UE to trigger a search for availability of any other PLMNs.

The recovery mechanisms defined for recovering from the SOR failure scenarios are not triggered, if a SOR failure is encountered when the UE is operating in manual mode. This is primarily because the manual mode is selected by the user, and the onus of selecting the PLMN (operator), for receiving services, lies with the user. Thus, the UE may continue to remain registered with the VPLMN even if SOR failures are detected. Therefore, even if the UE makes a transition from the manual to automatic mode, the UE continues to remain camped on the same PLMN, in which the SOR failure was encountered by the UE.

FIG. 1 illustrates a flowchart of a method 100 depicting an issue that arises due to the UE ignoring SOR failure in manual mode of operation. At step 101, the UE attempts to register with a VPLMN, while operating in the manual mode. The User services identity module (USIM) of the UE is configured to mandatorily receive SOR information from the VPLMN during the registration with the VPLMN. Once the VPLMN accepts the registration request of the UE, at step 102, the UE detects an occurrence of a SOR failure scenario on determining that SOR information is missing or the SOR information received from the VPLMN has been tampered.

The UE can perform a security check on the received SOR information, in order to determine whether the integrity of the SOR information has been compromised. If the security check fails, the UE can deduce that the integrity of the SOR information has been compromised. Non-reception of SOR information and detection of tampering of SOR information can be deemed as occurrence of SOR failure scenarios. As the UE is operating in the manual mode, at step 103, the occurrence of the SOR failure scenario is ignored. This is because, in the manual mode the user had chosen the currently selected PLMN, and, thus, continues to remain camped on the PLMN on which SOR failure had occurred.

Therefore, even if the UE switches to the automatic mode, the UE does not trigger a recovery scan to detect another VPLMN in order to recover from the SOR failure encountered while the UE was operating in the manual mode. At step 104, the UE continues to camp on the same VPLMN where the SOR failure was encountered, despite the possibility of availability of one or more preferred VPLMNs (of the HPLMN) in the area.

FIG. 2A illustrates an example scenario, wherein a UE is camped on a first VPLMN and the UE is configured to recover from SOR related failures by receiving SOR information from either the first VPLMN or a second VPLMN, according to embodiments as disclosed herein. As depicted in FIG. 2A, the UE, camped on the first VPLMN, detects a SOR related failure, while operating in the manual mode. The UE can track the SOR related failure and can initiate recovery procedures for resolving the SOR related failure when the UE switches to the automatic mode. The UE can initiate the recovery procedures, when the UE starts operating in the automatic mode, after switching from the manual mode while the UE remains connected to the first VPLMN. The recovery procedures may not be initiated if the UE is able to receive authentic SOR information from the first VPLMN, while the UE operates in the manual mode. The recovery procedures allow the UE to receive the SOR information from the second VPLMN (a high priority VPLMN), if the UE is able to detect the second VPLMN successfully and register with the second VPLMN. The UE triggers a PLMN search for detecting the second VPLMN, if the UE is unable to receive the SOR information from the first VPLMN or if a security check, performed on SOR information, received from the first VPLMN fails.

In an embodiment, the recovery procedure includes triggering an initial registration with the first VPLMN, where the SOR related failure was encountered when the UE was operating in the manual mode. The initial registration is triggered when the UE switches to the automatic mode from the manual mode. If the initial registration is successful, the SOR related failure is considered as resolved. This is because, the initial registration is considered successful, only if the UE receives authentic SOR information during the initial registration with the first VPLMN.

In an embodiment, the recovery procedure includes triggering a PLMN search procedure, when the UE switches to the automatic mode from the manual mode. During the PLMN search, the first VPLMN, on which the UE is currently camped, is considered as the least preferred PLMN. The PLMN search takes place after the UE 200 moves to one of an IDLE state and a radio resource control (RRC)-INACTIVE state. If the UE is able to detect the second VPLMN during the PLMN search and receives authentic SOR information during registration with the second VPLMN, the SOR related failures can be considered to be resolved.

The registration procedure in this embodiment refers to an initial registration procedure or a mobility registration procedure.

In an embodiment, the recovery procedure includes periodically triggering PLMN search, in order to recover from the SOR related failure. The periodic triggering continues, if the UE, operating in the automatic mode, is unable to register with the second VPLMN and/or if the UE is not able to receive the authentic SOR information from the second VPLMN, during the registration with the second VPLMN. In this scenario, the UE stays camped and registered on any of the PLMN's where SOR failure has been encountered (first or second PLMN in the current case) and may periodically attempt SOR information recovery. The embodiments include initializing a back-off timer to control the frequency of triggering the PLMN search.

Figure 2B:
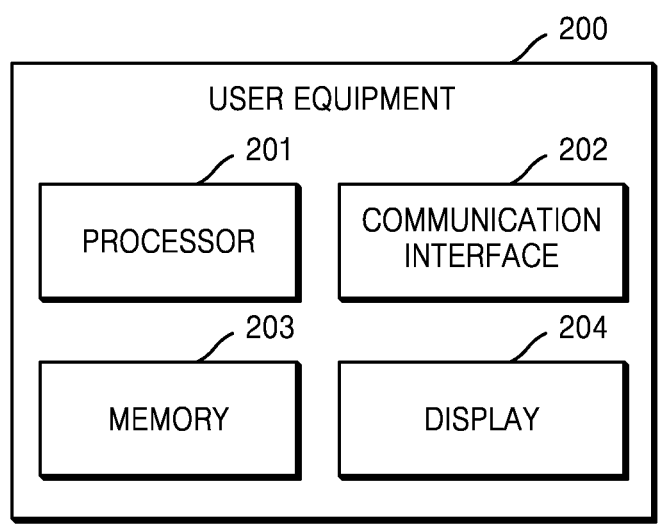
FIG. 2B illustrates various units of the UE configured to recover from SOR related failures by receiving SOR information according to embodiments as disclosed herein.

FIG. 2B illustrates various units of the UE 200 configured to recover from SOR related failures by receiving SOR information, according to embodiments as disclosed herein. As depicted in FIG. 2B, the UE 200 includes a processor 201, a communication interface 202, a memory 203, and a display 204. The UE 200 can be camped on the first VPLMN. The user services identity module (USIM) of the UE 200 is configured to mandatorily receive SOR information from the first VPLMN during the initial registration with the first VPLMN. The SOR information allows the UE 200 to camp on to a VPLMN, which is recommended by the home-PLMN (HPLMN).

If the UE 200, operating in manual/automatic mode encounters a SOR failure, the processor 201 can trigger recovery mechanisms to overcome the SOR failure. The integrity of the received SOR information can be considered as compromised or can be identified as tampered, if a security check performed on the received SOR information fails. If the security check passes, the received SOR information can be considered as authentic SOR information. If processor 201 determines, based on the security check, the received SOR information is authentic, then the SOR failure is considered as resolved.

If the UE 200 encounters a SOR failure, when the UE 200 is operating in the manual mode, the recovery mechanisms can be triggered when the UE 200 switches to the automatic mode from the manual mode. If the SOR failure is resolved while the UE 200 is still operating in the manual mode, the processor 201 may not trigger the recovery mechanisms to resolve the SOR related failures. The recovery mechanisms can be triggered by the processor 201, after the UE 200 switches to the automatic mode while the UE 200 remains camped on the first VPLMN, if the processor 201 is able to determine that a SOR failure had occurred when the UE 200 was operating in the manual mode.

The processor 201 can be configured to track any occurrence of SOR failure when the UE 200 is operating in the manual mode. In an embodiment, the processor 201 can track the occurrence of the SOR failure using a flag. The processor 201 can either set the SOR failure flag to "1," or "TRUE,"; or reset the SOR failure flag to "0," or "FALSE." The processor 201 can set the flag if the UE 200 encounters a SOR failure. The processor 201 can reset the flag when the SOR failure is resolved. The processor 201 can check a status (set/reset) of the flag when the UE 200 switches to the automatic mode. If the flag is set, the processor 201 can determine that a SOR failure had occurred, when the UE 200 was operating in the manual mode. If the flag is reset, the processor 201 can determine that SOR failure had not occurred when the UE 200 was operating in the manual mode.

In an embodiment, the processor 201 can track the occurrences of SOR failures, when the UE 200 is operating in the manual mode, by maintaining, in the memory 203, a list of VPLMNs, where a SOR failure was encountered by the UE 200. In an embodiment, the processor 201 can utilize the list, "PLMN's where registration was aborted due to SOR," to track the occurrences of SOR failures.

In an example, when the UE 200 encounters a SOR failure while operating in the manual mode when camped on a first VPLMN, the processor 201 populates the first VPLMN, on which the UE 200 is camped on, in the list. If at any point of time, the UE 200, operating in the manual mode, receives SOR information from the first VPLMN, and if the received SOR information has been successfully decoded, the processor 201 can reset the flag and/or depopulate the first VPLMN from the list. If the UE receives an indication from the first VPLMN that there is no SOR information to be provided, the processor 201 can reset the flag and/or depopulate the first VPLMN from the list.

Embodiments herein are explained considering that only one VPLMN has been populated in the list. However, it may be obvious to a person of ordinary skill in the art that there may be more than one VPLMN, which have been populated in the list.

There can be scenarios (such as user selecting a different PLMN), because of which the processor 201 can trigger a PLMN search when the UE 200 is operating in the manual mode. If the UE 200 is able to successfully register with another VPLMN while operating in the manual mode, wherein SOR information is received during the registration, and if the SOR information is successfully decoded, the SOR failure can be considered as resolved. The UE 200 can successfully decode the SOR information only if the SOR information is authentic. The SOR information is determined to be authentic if security checks run on the received SOR information is successful. This is because, as per the 3rd generation partnership project (3GPP) specification, the UE 200 is configured to mandatorily receive SOR information from the VPLMN during the initial registration with the VPLMN. If the UE 200 receives the SOR information during the registration, the processor 201 can reset the flag and/or depopulate the list, used to remembering the VPLMNs where SOR failure has been encountered previously.

Consider that a SOR failure had occurred when the UE 200, camped on the first VPLMN, was operating in the manual mode. On encountering the SOR failure, the UE 200 had set the flag and/or populated the first VPLMN on the list. The SOR failure was not resolved when the UE 200 was operating in the manual mode. When the UE 200 switches to the automatic mode, the processor 201 can determine that the flag is set and/or the first VPLMN is populated in the list; and deduce that a SOR failure had occurred when the UE 200 was operating in the manual mode.

In an embodiment, the UE 200 initiates a first recovery procedure in order to receive SOR information, which was either not received or was tampered (which were detected by the processor 201 when the UE 200 was operating in the manual mode). The recovery procedure allows the processor 201 to trigger an initial registration with the first VPLMN. If the initial registration with the first VPLMN is found to be successful and if the SOR information is successfully received and decoded without any errors, the SOR failure can be considered as resolved. This consideration may be applicable if the USIM, in the UE 200, is configured to mandatorily receive the SOR information from the first VPLMN, during the initial registration of the UE 200 with the first VPLMN.

The initial registration can be considered as successful only if the UE 200 receives the SOR information from the first VPLMN during the initial registration and the processor 201 determines that the integrity of the SOR information has not been compromised. Thereafter, the processor 201 can reset the flag and/or depopulate the first VPLMN from the list.

On the other hand, if the UE 200 does not receive the SOR information from the first VPLMN during the initial registration, or if the processor 201 determines that the integrity of the SOR information, received from the first VPLMN, has been compromised, the SOR failure can be considered as persistent. The flag may remain set and/or the list may continue to populate the first VPLMN. The processor 201 can periodically trigger a PLMN search, in order to detect a high priority VPLMN and attempt to register with the detected VPLMN.

If the USIM is not configured to mandatorily receive SOR information from the first VPLMN during the initial registration and if the SOR information is not received during the initial registration; the flag may not be reset by the processor 201 and/or the first VPLMN may continue to be populated in the list. The UE 200 can periodically trigger a PLMN search, in order to detect a high priority VPLMN and attempt to register with the detected VPLMN.

In another embodiment, the UE 201 can initiate a second recovery mechanism, which allows the processor 201 of the UE 200 to trigger a PLMN search. The PLMN search is triggered while the UE 200 remains camped on the first VPLMN. The PLMN search is triggered after the UE 200 moves to the IDLE state and/or in the RRC INACTIVE state. During the PLMN search, the first VPLMN, on which the UE 200 is currently camped, is considered as the least preferred VPLMN. In general, when the UE 200 maintains a list of VPLMNs on which SOR failure has occurred, and all the VPLMNs in the list are considered to be of least priority. The embodiments include selecting a configuration to set the priority of VPLMNs, within the list of VPLMNs where SOR failure has been encountered. If the UE 200 is able to successfully detect the second VPLMN and successfully completes initial registration with the second VPLMN, the SOR failure can be considered as resolved.

The USIM is configured to receive the SOR information from the second VPLMN during the initial registration with the second VPLMN. Therefore, the registration of the UE 200 with the second VPLMN can be considered as successful, if the UE 200 is able to receive the SOR information from the second VPLMN. Successful registration with the second VPLMN can indicate that the UE 200 had not encountered any SOR related failure, i.e., the second VPLMN had provided the SOR information to the UE 200. Thereafter, the processor 201 can reset the flag and/or depopulate the first VPLMN from the list. The processor 201 can also reset the flag and/or depopulate the first VPLMN from the list if the UE 200 receives the SOR information through a NAS message from a core network. In an embodiment, all VPLMNs in the list can be cleared, instead of depopulating a single VPLMN.

On the other hand, if the UE 200 does not receive the SOR information from the second VPLMN, or if the processor 201 determines that the integrity of the SOR information, received from the second VPLMN, has been tampered with; the SOR failure can be considered as persistent. Due to a lack of integrity, the SOR information, received from the second VPLMN, is not authenticated. The UE 200 may attempt to find a different VPLMN, on which SOR failure has not been encountered. The flag may remain set and/or the list may continue to be populated with both the first as well as second VPLMN(s). If no other PLMNs are found, then the UE may register on any of the VPLMNs, i.e., the first VPLMN or the second VPLMN, on which SOR failure has been encountered. The processor 201 can periodically trigger a PLMN search, in order to detect a high priority VPLMN other than ones on which SOR failure has been encountered and register with that VPLMN. The UE 200 aims to receive the SOR information during the initial registration or via any of the other NAS messages.

If the UE 200 is operating in the automatic mode and the SOR failure is not resolved (the flag is set and/or the first VPLMN is populated in the list), the processor 201 of the UE 200 can periodically trigger a PLMN search. Consider that at a current instant, the UE 200 is camped on the first VPLMN, as previous attempts to receive the SOR information by registering with other VPLMNs have not been successful. The PLMN search is periodically triggered in order to obtain service from a higher priority VPLMN, as specified by the HPLMN. The first VPLMN, the second VPLMN, and the other VPLMNs that are populated in the list (where SOR failure was encountered in manual mode) are considered to be of lowest priority (or the least preferred) during the PLMN search and selection procedure.

In an embodiment, the UE 200 can periodically trigger the PLMN search, even if the UE 200 is currently registered on the most preferred Operator-PLMN (OPLMN), as per the existing OPLMN list, if the UE 200 encounters a SOR failure.

In an embodiment, the processor 201 of the UE 200 can initialize a first timer (as long as the UE 200 remains camped on a VPLMN where SOR failure had occurred) which can expire after a predefined time period. Once the first timer expires, the processor 201 can trigger PLMN search. During the PLMN search, the VPLMNs (on which SOR failure has been encountered) populated in the list are considered low priority VPLMNs. If an allowed VPLMN (other than those in the SOR failure list) is detected during the PLMN search, the UE 200 can attempt to register with the detected VPLMN. During the registration procedure, if the processor 201 determines that the SOR information is not received or if the received SOR information has been tampered with; the registration is considered as unsuccessful and the processor 201 can restart the first timer. If the SOR information received from the first VPLMN has not been tampered with, i.e., authentic, then the SOR failure is considered as resolved. After the expiry of the first timer again, the processor 201 can re-trigger the PLMN search.

In an embodiment, a second timer can be initialized, as per the existing 3GPP specification, which determines the periodicity of the PLMN searches. The second timer can be initialized if the first VPLMN, on which the UE 200 is camped, is not a high priority VPLMN in that location; In an embodiment even if existing conditions in the 3GPP specification do not result in the start of the second timer, the SOR failure can be considered a trigger to force start the second timer. When the second timer expires, the PLMN search can be triggered. During the PLMN search, the VPLMNs in the list are considered as low priority VPLMNs. The second timer can be force-triggered by the processor 201, if the first VPLMN is the one of the least preferred VPLMN based on information specified by the HPLMN. The second timer can also be force-triggered by the processor 201 periodically, if the SOR failure continues to persist. The SOR failure persists, if the UE 200 is not able to register with a VPLMN, which provides the SOR information during the initial registration with the UE 200. The processor 201 can trigger the PLMN search after the expiry of the second timer.

The processor 201 can periodically trigger the PLMN search, with a periodicity of a time interval spanning the start and expiry of the first timer or the second timer; until the UE 200 is able to recover from the SOR failure. The UE 200 can recover from the SOR failure by receiving the accurate SOR information from a VPLMN, detected during the PLMN search, wherein the SOR information is received during the registration with the detected VPLMN. If the SOR failure is resolved, neither of the first timer nor the second timer is triggered by the processor 201.

During the course of the UE 201 being camped and registered on the first VPLMN (where the SOR failure was encountered by the UE 200), and possibly in the same area, the processor 201 may trigger the PLMN search due to the occurrence of other procedures. The procedures may require recovery from the SOR related failures and, therefore, cause the processor 201 to trigger the PLMN searches prior to the expiry of the first timer or the second timer. In such scenarios, the processor 201 can avoid triggering frequent PLMN searches. In an embodiment, the processor 201 can initialize a back-off timer, which expires after a predefined time period.

The processor 201 can configure the back-off timer to ensure that the PLMN searches are triggered after the expiry of the back-off timer, irrespective of there being triggers to initiate a PLMN search, either due to expiry of first or second timer, or any of the other existing triggers for initiating PLMN searches. The back-off timer can be started after a PLMN search is performed, and the UE 200 being unable to successfully register with a VPLMN (due to detection of absence of SOR information or failure of security check on SOR information), registers again with the first VPLMN (in general a VPLMN where the SOR failure was initially encountered and is yet to be resolved).

The processor 201 can prevent the procedures to trigger PLMN searches, for resolving SOR failure, prior to the expiry of the back-off timer. However, the processor 201 can stop the back-off timer, if the processor 201 detects a change in location of the UE 200, change in network coverage conditions, availability of new networks, and so on.

FIG. 2B illustrates exemplary units of the UE 200, but it is to be understood that other embodiments are not limited thereon. In other embodiments, the UE 200 may include less or more number of units. Further, the labels or names of the units of the UE 200 are used only for illustrative purpose and does not limit the scope of the present disclosure. One or more units can be combined together to perform same or substantially similar function in the UE 200.

FIG. 3 illustrates a flowchart of a method 300 depicting a procedure for recovering from a SOR failure, wherein the procedure triggers a PLMN search to detect a high priority second VPLMN and successfully register with the second VPLMN, for receiving SOR information from the second VPLMN, according to embodiments as disclosed herein. At step 301, the method includes registering with a first VPLMN, while operating in the manual mode. If the first VPLMN accepts the registration request of the UE 200, the UE 200 camps on to the first VPLMN. At step 302, the method includes detecting an occurrence of a SOR failure. The SOR failure could have occurred during the registration procedure with the first VPLMN or after the UE 200 had registered with the first VPLMN.

Examples of SOR failures are determining that SOR information is missing in an initial registration accept message (even though the UE 200 is configured to receive SOR information in the initial registration accept message), the SOR information received from the first VPLMN has been tampered with, and so on. If the SOR information received from the first VPLMN has not been tampered with, i.e., if the received SOR information authentic, then the SOR failure is considered as resolved.

At step 303, the method includes tracking (remembering) the occurrence of the SOR failure. In an embodiment, the UE 200, operating in the manual mode, can track the occurrence of the SOR failure using a flag. The SOR failure flag can be set to "1," or reset to "0." The UE 200 can set the flag on encountering a SOR failure. The UE 200 can reset the flag to "0" when the SOR failure is resolved. As the UE 200 had detected the SOR failure, the flag is set.

In an embodiment, the UE 200, operating in the manual mode, can track (remember) the occurrence of the SOR failures by maintaining a list of VPLMNs, where a SOR failure was encountered by the UE 200. As the UE 200 had detected the SOR failure, the first VPLMN is populated on the list. In an embodiment, the list, "PLMN's where registration was aborted due to SOR," can be utilized to track the occurrences of SOR failures.

If the embodiments trigger a PLMN search, while the UE 200 is operating in the manual mode, due to other procedures, there may be a possibility of resolving the SOR failure. If the UE 200 is able to detect a high priority VPLMN during the PLMN search and successfully registers with the high priority VPLMN, while operating in the manual mode, the SOR information is received.

At step 304, the UE 200 transitions from the manual mode and starts operating in the automatic mode. At step 305, the method includes determining that an SOR failure had occurred on the first VPLMN when the UE 200 was operating in the manual mode and the SOR failure has not been resolved yet. The embodiments include determining that the SOR failure had occurred by checking the status (set/reset) of the flag and/or the list. The embodiments include determining that the flag is set and/or the first VPLMN is populated on the list. At step 306, the UE 200 continues to remain camped on the first VPLMN.

At step 307, the method includes determining whether the UE 200 is operating in the IDLE state and the RRC-INACTIVE state. If it is determined that the UE is operating in IDLE state and the RRC is inactive, the method includes determining, at step 308, whether the UE 200 had established an emergency protocol data unit (PDU) session. If it is determined that the UE 200 is not operating in IDLE state and the RRC is active state, the UE 200 continues to remain camped on the first VPLMN (step 306).

If it is determined, at step 308, that the UE 200 had established an emergency PDU session, the method includes determining, at step 309, whether the emergency PDU session has been released. In case the PDU session is active, the UE 200 needs to wait and continue to check whether the PDU session has been released (step 309). If it is determined, at step 309, that the PDU session has been released, the method includes determining whether the UE 200 is operating in the IDLE state and the RRC-INACTIVE state (step 307).

If it is determined, at step 308, that the UE 200 had not established an emergency PDU session or if there are no emergency PDU sessions active, the method includes triggering, at step 310, a PLMN search to detect a second VPLMN, which is a high priority VPLMN, wherein the first VPLMN is considered of lowest priority during the PLMN search. The UE 200 needs to wait until the UE 200 is operating in IDLE state and the RRC is in the inactive state, and any emergency PDU session, if established, needs to be released, to trigger the PLMN search procedure.

The PLMN search is aimed at detecting the second VPLMN and registering with the second VPLMN without any SOR failure. If the UE 200 is able to successfully register with the second VPLMN and there are no SOR failures, the SOR failure is considered as resolved. The registration is considered successful if the UE 200 receives SOR information from the second VPLMN during the registration and if a security check performed on the received VPLMN is successful.

The various actions in the flowchart 300 may be performed in the order presented, in a different order, or simultaneously. Further, in some embodiments, some actions listed in FIG. 3 may be omitted.

Figure 4A:
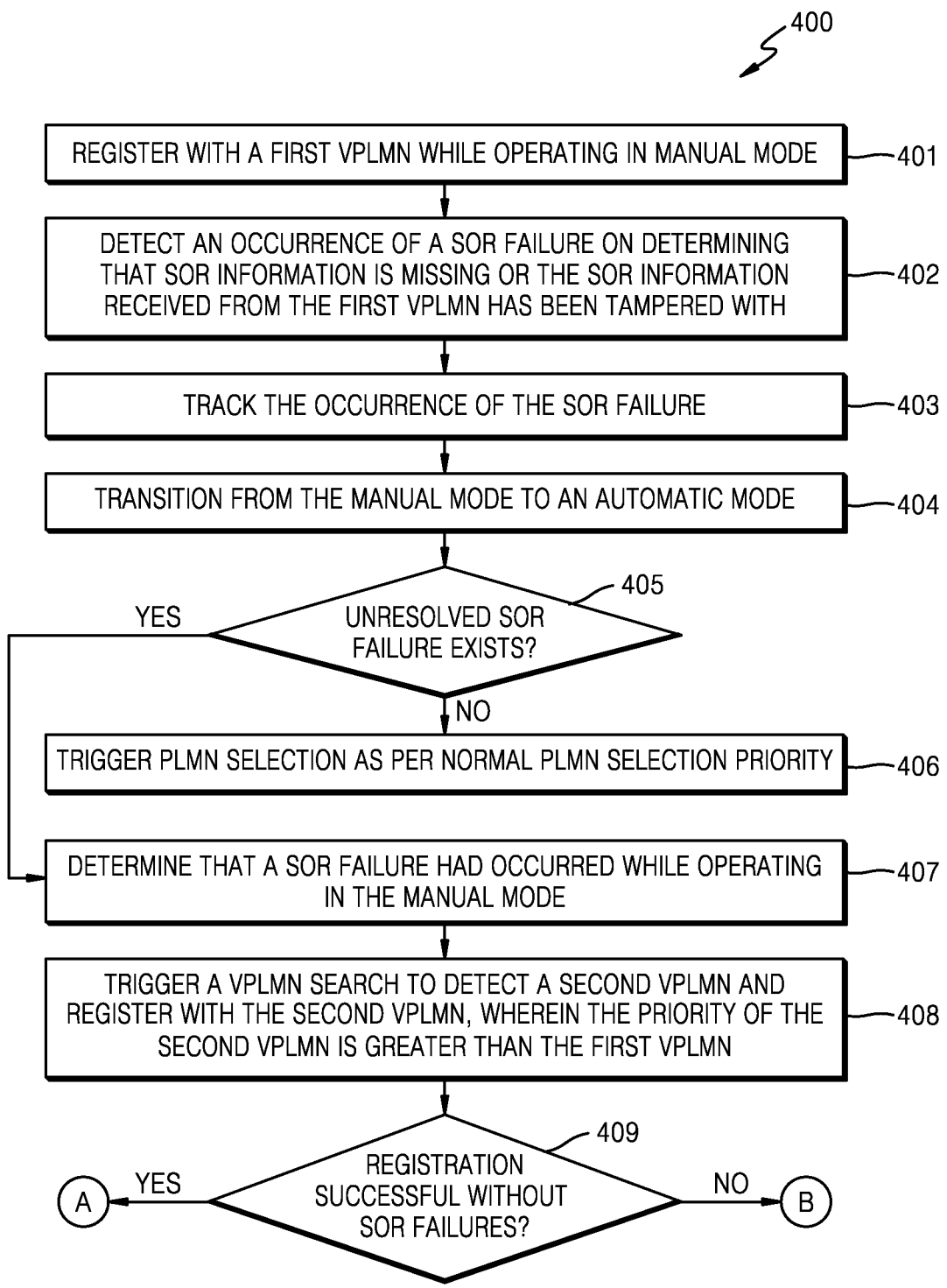
FIGS. 4A and 4B illustrate flowcharts of recovering methods from the SOR related failure, wherein the procedure triggers a PLMN search to detect a second VPLMN and successfully register with the second VPLMN, in order to receive SOR information from the second VPLMN, according to embodiments as disclosed herein.
Figure 4B:
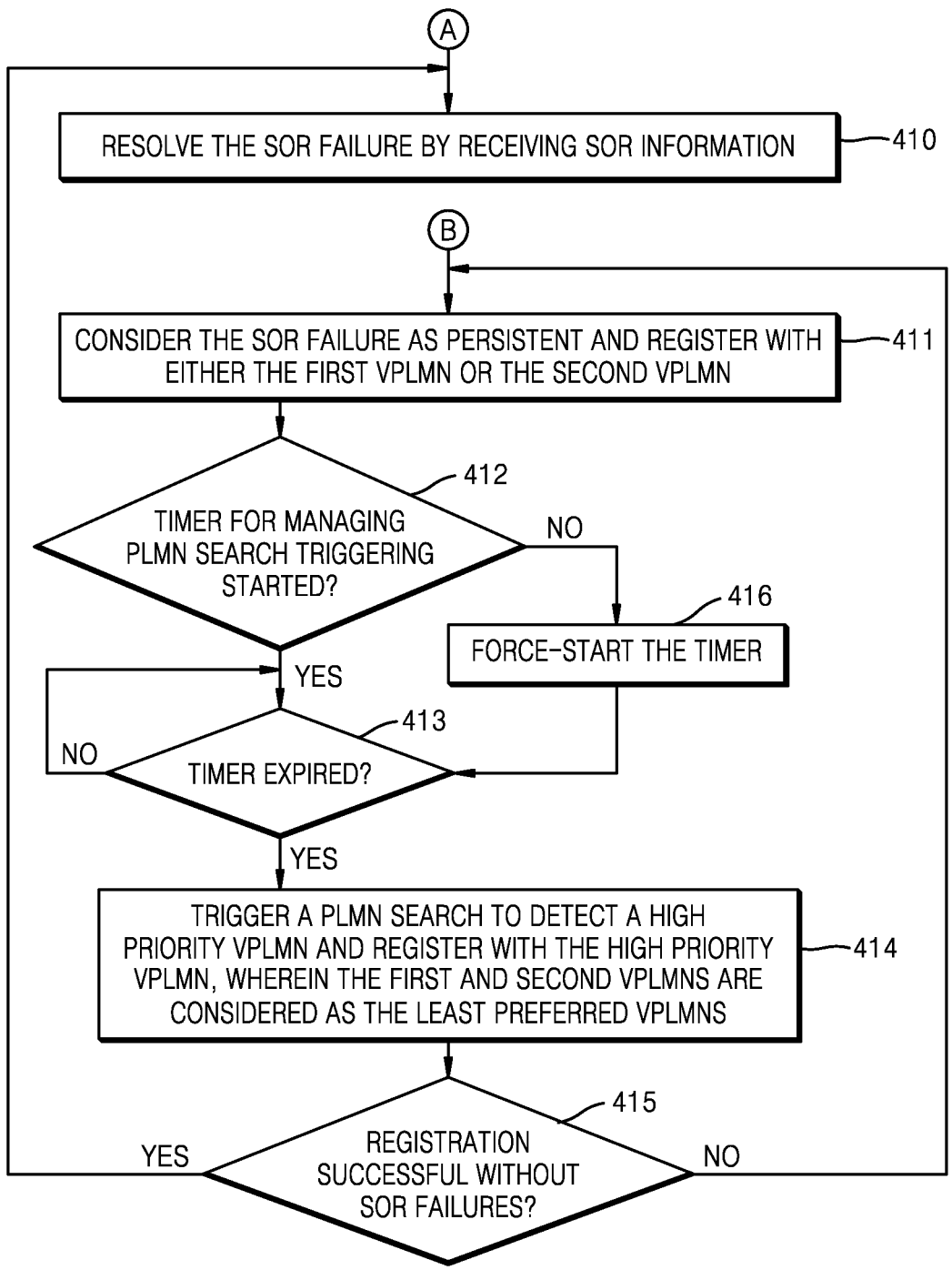

FIGS. 4A and 4B illustrate flowcharts of a method 400 depicting another procedure for recovering from the SOR failure, wherein the procedure triggers a PLMN search to detect a second VPLMN and successfully register with the second VPLMN, for receiving SOR information from the second VPLMN, according to embodiments as disclosed herein. At step 401, the UE 200 attempts to register with a first VPLMN, while operating in the manual mode. If the first VPLMN accepts the registration request of the UE 200, the UE 200 camps on to the first VPLMN. At step 402, the embodiments include detecting an occurrence of a SOR failure. Examples of SOR failures are determining that SOR information is missing, the SOR information received from the first VPLMN has been tampered with, and so on. If the SOR information received from the first VPLMN has not been tampered with, i.e., authentic, then the SOR failure is considered as resolved.

At step 403, the embodiments include tracking the occurrence of the SOR failure. In an embodiment, the UE 200, operating in the manual mode, can track the occurrence of the SOR failure using a flag. The SOR failure flag can be set to "1," or reset to "0." The UE 200 can set the flag on encountering a SOR failure. The UE 200 can reset the flag to "0" when the SOR failure is resolved. As the UE 200 had detected the SOR failure, the flag is set.

In an embodiment, the UE 200, operating in the manual mode, can track the occurrence of the SOR failures by maintaining a list of VPLMNs, where a SOR failure was encountered by the UE 200. As the UE 200 had detected the SOR failure, the first VPLMN is populated on the list. In an embodiment, the list, "PLMN's where registration was aborted due to SOR," can be utilized to track the occurrences of SOR failures.

If the embodiments trigger a PLMN search, while the UE 200 is operating in the manual mode, due to other procedures, there may be a possibility of resolving the SOR failure. If the UE 200 is able to detect another VPLMN during the search and successfully registers with the detected VPLMN, while operating in the manual mode, the SOR information is received. This is because, as per the 3rd generation partnership project (3GPP) specification, the UE 200 is configured to mandatorily receive SOR information from the VPLMN during the registration with the VPLMN; if the registration is to be considered as successful. On receiving the SOR information from the detected VPLMN, the embodiments include performing a security check on the received SOR information. If the security check passes, the embodiments include resetting the flag and/or depopulating the first VPLMN from the list.

If the UE 200 receives an indication from the first VPLMN that there is no SOR information to be provided, the embodiments can reset the flag and/or depopulate the first VPLMN from the list. If the UE 200 is not able to receive SOR information, as long the UE 200 operates in the manual mode, the flag remains set and/or the first VPLMN remains populated in the list.

At step 404, the UE 200 transitions from the manual mode and starts operating in the automatic mode. At step 405, the embodiments include determining whether there has been an unresolved SOR failure, which had occurred when the UE 200 was operating in the manual mode. The embodiments include checking the status (set/reset) of the flag and/or the list to determine whether such an unresolved SOR failure exists. If the UE 200 determines, at step 406, that the flag is reset and/or the first VPLMN is not populated on the list, the embodiments determine that there is no unresolved SOR failure. Consequently, no recovery mechanisms are triggered. The embodiments can trigger PLMN selection as per normal PLMN selection priority. If it is determined that the flag is set and/or the first VPLMN is populated on the list, the embodiments include, at step 407, determining that a SOR failure had occurred when the UE 200 was operating in the manual mode, which needs to be resolved. Unresolved SOR failure can indicate that the UE 200 needs to receive SOR information.

If there is an unresolved failure detected (at step 407), the embodiments include triggering recovery mechanisms. At step 408, the embodiments include triggering a PLMN search while the UE 200 is camped on the first VPLMN. The PLMN search can be triggered immediately after the UE 200 detects the flag is set and/or the first VPLMN is populated on the list. In an embodiment, the PLMN search can be triggered after the UE 200 moves to either an IDLE state or an RRC-INACTIVE state. The triggering may be suspended until the UE 200 moves to the IDLE mode or if there is an active data session. During the PLMN search, the first VPLMN is considered as the least preferred VPLMN (as the first VPLMN is populated on the list). The PLMN search is aimed at detecting a second VPLMN, which can be high priority VPLMN and attempting to register with the second VPLMN, wherein the priority of the second VPLMN is higher than that of the first VPLMN.

The embodiments include determining, at step 409, whether the UE 200 is able to successfully register with the second VPLMN. The registration is considered as successful if the UE 200 receives SOR information from the second VPLMN during the registration and if a security check performed on the received VPLMN is successful. If it is determined that the registration with the second VPLMN is successful, at step 410, the SOR failure is considered as resolved.

If it is determined that the registration with the second VPLMN has not been successful, at step 411, the SOR failure is considered as persistent. The registration with the second VPLMN is considered unsuccessful, if the UE 200 does not receive the SOR information from the second VPLMN during the registration, or the integrity of the SOR information, received from the second VPLMN, has been compromised. The flag may remain set and/or the list may populate the second VPLMN, where the first VPLMN was previously included. The embodiments include attempting to register with either of the first VPLMN or the second VPLMN, until the UE is able to resolve the SOR failure by successfully receiving and decoding SOR information from a VPLMN.

The embodiments include periodically triggering a PLMN search, in order to detect another high priority VPLMN, as specified by the HPLMN, and registering with the detected VPLMN. The UE 200 remains camped on either of the first or second VPLMNs. The first VPLMN and the second VPLMN are considered to be of lowest priority during the PLMN search and selection procedure.

At step 412, the embodiments include determining whether a timer is started (which can be the first timer or the second timer). The timer can be initialized as per 3GPP specification for managing PLMN scan triggering. The embodiments can trigger a PLMN search when the timer expires. The timer can be configured to expire after a predefined time period.

If it is determined that the timer has been initialized, the embodiments include, at step 413, determining whether the timer had expired. If it is determined that the timer has expired, the embodiments include, at step 414, triggering a PLMN search. During the PLMN search, the first VPLMN and the second VPLMN, which are populated in the list, are considered low priority VPLMNs. The PLMN search is aimed at detecting a high priority VPLMN and registering with the high priority VPLMN. The embodiments include detecting a high priority VPLMN and attempting to register with the high priority VPLMN. At step 415, the embodiments include determining whether the UE 200 is able to successfully register with the detected VPLMN. If it is determined that the registration with the detected high priority VPLMN is successful and if SOR information has been received without any decoding failure, the SOR failure is considered as resolved (step 410). The UE 200 is able to recover from the SOR failure by receiving the accurate SOR information from the detected VPLMN, if the registration is successful.

If it is determined that the registration is unsuccessful, the SOR failure is considered as persistent (step 411). The SOR information is either not received or the integrity of the received SOR information has been compromised by the detected high priority VPLMN. The embodiments include restarting the timer (step 412 in affirmative). After the expiry of the timer (step 413), the embodiments include triggering the PLMN search again (step 414).

If it is determined that the timer has not been started (at step 412), the embodiments include, at step 416, force-starting the timer. Thereafter, the embodiments include triggering the PLMN search (step 414), after the expiry of the timer (step 413).

The embodiments continue to periodically trigger the PLMN search, with a periodicity of time interval spanning the start and expiry of the timer. The UE 200 is able to recover from the SOR failure by receiving the accurate SOR information (step 410) from a high-priority VPLMN, detected during the PLMN search (step 414), wherein the SOR information is received during the registration with the detected VPLMN (step 415 in affirmative).

The embodiments avoid triggering frequent PLMN searches by initializing a back-off timer, which expires after a predefined time period. The embodiments can prevent other procedures to trigger PLMN searches, or trigger PLMN searches after the expiry of the timer, for resolving SOR failure, prior to the expiry of the back-off timer. The embodiments configure the back-off timer to ensure that the PLMN searches are triggered after the expiry of the timer, while the UE 200 is camped on either of the first or second VPLMNs. The back-off timer can be started after a PLMN search is performed (step 414), and the UE 200, being unable to successfully register with a VPLMN, registers again with the first VPLMN or the second VPLMN (step 411), where the SOR failure was initially encountered.

The various actions in the flowchart 400 may be performed in the order presented, in a different order, or simultaneously. Further, in some embodiments, some actions listed in FIG. 4 may be omitted.

Figure 5B:
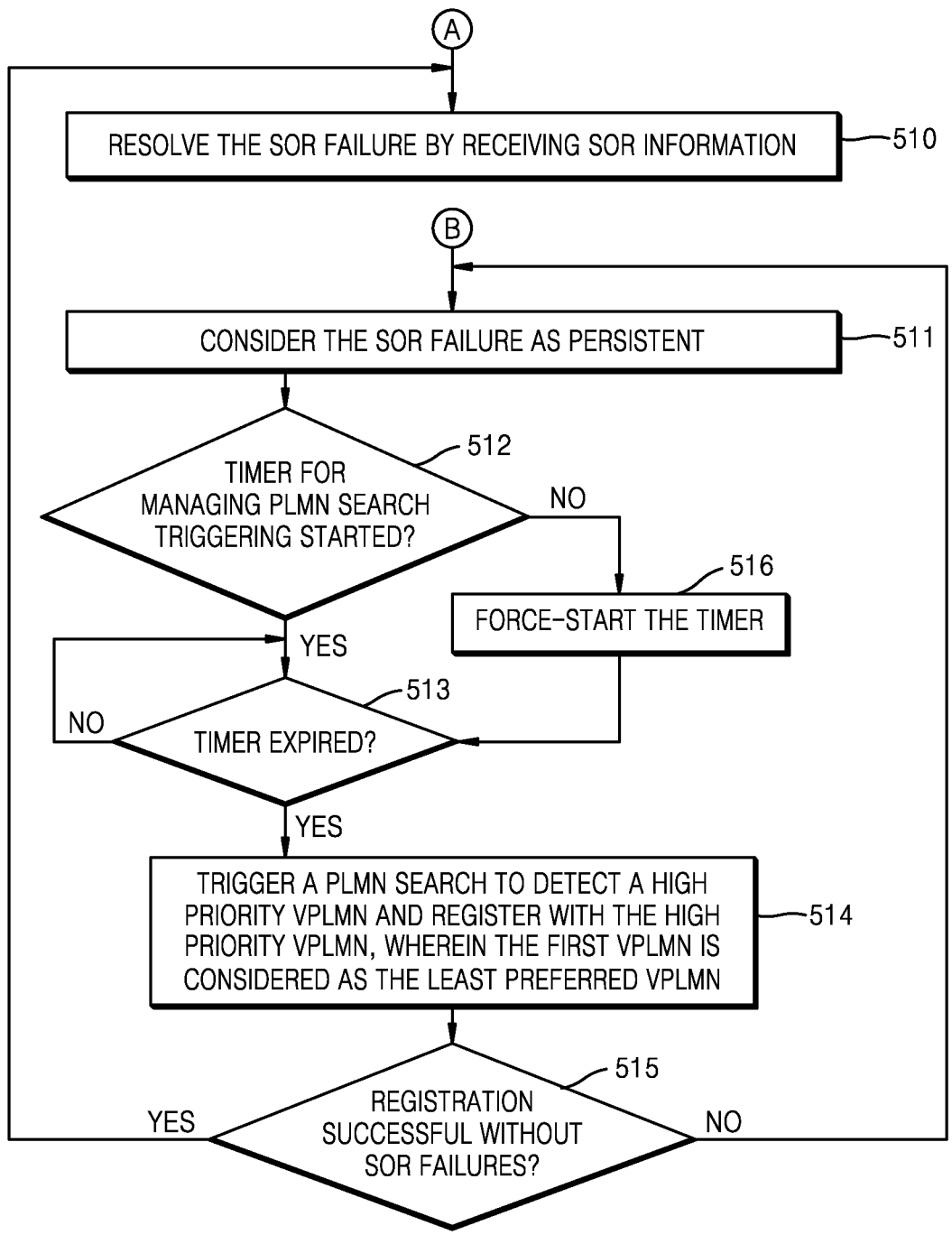

FIGS. 5A and 5B illustrate flowcharts of a method 500 depicting yet another procedure for recovering from the SOR failure, wherein the procedure triggers an initial registration with a first VPLMN, in order to receive SOR information from the first VPLMN, according to embodiments as disclosed herein. At step 501, the UE 200 attempts to register with a first VPLMN, while operating in the manual mode. If the first VPLMN accepts the registration request of the UE 200, the UE 200 camps on to the first VPLMN.

At step 502, the embodiments include detecting the occurrence of a SOR failure. Examples of SOR failures are determining that SOR information is missing, the SOR information received from the first VPLMN has been tampered with, and so on. The embodiments consider non-reception of SOR information from the first VPLMN during the registration with the first VPLMN, as a SOR failure. The embodiments consider non-preservation of the integrity of the received SOR information as a SOR failure. The embodiments include performing a security check to determine whether the integrity of the received SOR information has been compromised. If the security check fails, it can be determined that the received SOR information has been tampered by the first VPLMN. If the security check passes, the received SOR information can be considered as authentic SOR information. If authentic SOR information is received, the SOR failure is considered as resolved.

At step 503, the embodiments include tracking the occurrence of the SOR failure. In an embodiment, the UE 200, operating in the manual mode, can track the occurrence of the SOR failure using a flag. The SOR failure flag can be set to "1," or reset to "0." The UE 200 can set the flag on encountering a SOR failure. The UE 200 can reset the flag when the SOR failure is resolved. As the UE 200 had detected the SOR failure, the flag is set.

In an embodiment, the UE 200, operating in the manual mode, can track the occurrence of the SOR failures by maintaining a list of VPLMNs, where a SOR failure was encountered by the UE 200. As the UE 200 had detected the SOR failure, the first VPLMN is populated on the list. In an embodiment, the list, "PLMN's where registration was aborted due to SOR," can be utilized to track the occurrences of SOR failures.

If the embodiments trigger a PLMN search, while the UE 200 is operating in the manual mode, due to other procedures, there may be a possibility of resolving the SOR failure. If the UE 200 is able to detect another VPLMN during the search and successfully registers with the detected VPLMN, while operating in the manual mode, the SOR information is received. This is because, as per the 3rd generation partnership project (3GPP) specification, the UE 200 is configured to mandatorily receive SOR information from the VPLMN during the registration with the VPLMN; if the registration is to be considered as successful. On receiving the SOR information from the detected VPLMN, the embodiments include performing a security check on the received SOR information. If the security check passes, the embodiments include resetting the flag and/or depopulating the first VPLMN from the list. The SOR failure is considered as resolved.

If the UE 200 receives an indication from the first VPLMN that there is no SOR information to be provided, the embodiments can reset the flag and/or depopulate the first VPLMN from the list. If the UE 200 is not able to receive SOR information, as long the UE 200 operates in the manual mode, the flag remains set and/or the first VPLMN remains populated on the list.

At step 504, the UE 200 transitions from the manual mode and starts operating in the automatic mode. At step 505, the embodiments include determining whether there has been an unresolved SOR failure, which had occurred when the UE 200 was operating in the manual mode. The embodiments include checking the status (set/reset) of the flag and/or the list to determine whether such an unresolved SOR failure exists. If the UE 200 determines, at step 506, that the flag is reset and/or the first VPLMN is not populated on the list, the embodiments determine that there is no unresolved SOR failure. Consequently, no recovery mechanisms are triggered. The embodiments can trigger PLMN selection as per normal PLMN selection priority. If it is determined that the flag is set and/or the first VPLMN is populated on the list, the embodiments include, at step 507, determining that a SOR failure had occurred when the UE 200 was operating in the manual mode, which needs to be resolved. Unresolved SOR failure can indicate that the UE 200 needs to receive SOR information.

If there is an unresolved failure detected (at step 507), the embodiments include triggering recovery mechanisms. At step 508, the embodiments include triggering an initial registration with the first VPLMN. The embodiments include determining, at step 509, whether the initial registration is successful. The initial registration is considered as successful if the UE 200 receives the SOR information from the first VPLMN during the initial registration and if the received SOR information is successfully decoded. If it is determined that the initial registration with the first VPLMN successful, at step 510, the SOR failure is considered as resolved. Thereafter, the embodiments can reset the flag and/or depopulate the first VPLMN from the list.

If it is determined that the initial registration with the first VPLMN has not been successful, at step 511, the SOR failure is considered as persistent. Unsuccessful registration indicates that the UE 200 has not received the SOR information from the first VPLMN during the initial registration, or the integrity of the SOR information, received from the first VPLMN, has been compromised. The flag may remain set and/or the list may continue to be populated with the first VPLMN.

The embodiments include periodically triggering a PLMN search, in order to detect a high priority VPLMN, as specified by the HPLMN, and register with the detected VPLMN. The UE 200 remains camped on to the first VPLMN, as previous attempts to receive the SOR information by registering with other VPLMNs have not been successful. The first VPLMN is populated in the list (where SOR failure was encountered when the UE 200 was operating in manual mode) are considered to be of lowest priority (or the least preferred) during the PLMN search and selection procedure.

At step 512, the embodiments include determining whether a timer has been started (which can be the first timer or the second timer). The timer can be initialized as per 3GPP specification for managing PLMN scan triggering. The embodiments can trigger a PLMN search when the timer expires. The timer can be configured to expire after a predefined time period.

If it is determined that the timer has been initialized, the embodiments include, at step 513, determining whether the timer had expired. If it is determined that the timer has expired, the embodiments include, at step 514, triggering a PLMN search. During the PLMN search, the first VPLMN and the VPLMNs, which are populated in the list, are considered low priority VPLMNs. The PLMN search is aimed at detecting a high priority VPLMN and registering with the high priority VPLMN. The embodiments include detecting a high priority VPLMN and attempting registration with the high priority VPLMN. At step 515, the embodiments include determining whether the UE 200 is able to successfully register with the detected VPLMN. If it is determined that the registration is successful, the SOR failure is considered as resolved (step 510). The UE 200 is able to recover from the SOR failure by receiving the accurate SOR information from the detected VPLMN, if the registration is successful.

If it is determined that the registration is unsuccessful, the SOR failure is considered as persistent (step 511). The SOR information is either not received or the received SOR information has been tampered with. The embodiments include restarting the timer (step 512 in affirmative). After the expiry of the timer (step 513), the embodiments include triggering the PLMN search again (step 514).

If it is determined that the timer has not been started (at step 512), the embodiments include, at step 516, force-starting the timer. Thereafter, the embodiments include triggering the PLMN search (step 514), after the expiry of the timer (step 513).

The embodiments continue to periodically trigger the PLMN search, with a periodicity of time interval spanning the start and expiry of the timer. The UE 200 is able to recover from the SOR failure by receiving the accurate SOR information (step 510) from a high-priority VPLMN, detected during the PLMN search (step 514), wherein the SOR information is received during the registration with the detected VPLMN (step 515 in affirmative).

The embodiments herein avoid triggering frequent PLMN searches by initializing a back-off timer, which expires after a predefined time period. The embodiments can prevent other procedures to trigger PLMN searches, or trigger PLMN searches after the expiry of the timer (check step 512), for resolving SOR failure, prior to the expiry of the back-off timer. The embodiments configure the back-off timer to ensure that the PLMN searches are triggered after the expiry of the timer, while the UE 200 is camped on the first PLMN. The back-off timer can be started after a PLMN search is performed (step 514), and the UE 200, being unable to successfully register with a VPLMN, registers again with the first VPLMN (where the SOR failure was initially encountered).

The various actions in the flowchart 500 may be performed in the order presented, in a different order, or simultaneously. Further, in some embodiments, some actions listed in FIG. 5 may be omitted.

The embodiments disclosed herein can be implemented through at least one software program running on at least one hardware device and performing network management functions to control the network elements. The network elements shown in FIG. 2b include blocks which can be at least one of a hardware device or a combination of hardware device and software module.

The embodiments disclosed herein describe methods and systems for recovering from SOR related failures by receiving SOR information. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit hardware description language (VHDL) another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the present disclosure may be implemented on different hardware devices, e.g., using a plurality of CPUs.

Figure 6:
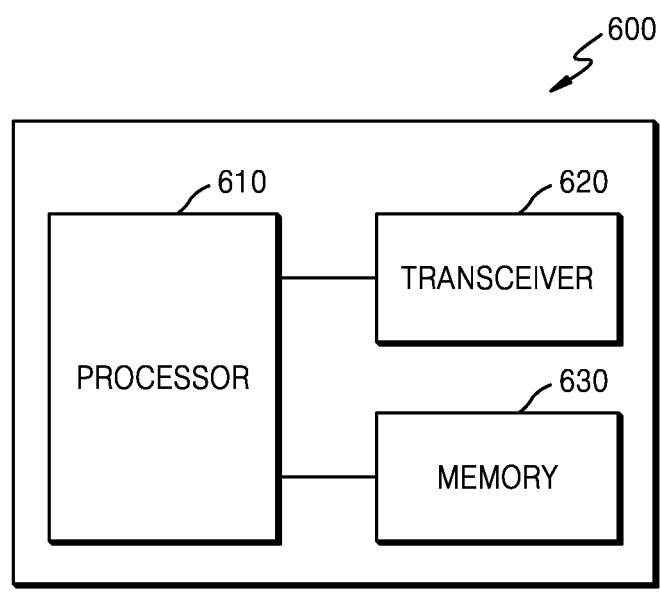
FIG. 6 illustrates a block diagram of an entity according to embodiments of the present disclosure.

FIG. 6 illustrates a block diagram of an entity according to embodiments of the present disclosure.

The entity 600 may correspond to a network function in a core network. For example, the entity 600 may be an access and mobility management function (AMF). Also, the entity 600 may correspond to a node in a network, PLMN, VPLMN or HPLMN. Also, the entity 600 may be a Base station. However, the entity 600 is not limited to the above-described example. Referring to the FIG. 6, the entity 600 may include a processor 610, a transceiver 620 and a memory 630. However, all of the illustrated components are not essential. The entity 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the provided function, process, and/or method. Operation of the entity 600 may be implemented by the processor 610.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the entity 600. The memory 630 may be connected to the processor 610 and store at least one instruction or a protocol or a parameter for the provided function, process, and/or method. The memory 630 may include read-only memory (ROM) and/or random access memory (RAM) and/or hard disk and/or CD-ROM and/or DVD and/or other storage devices.

In an exemplary embodiment, the entity 600 may transmit a registration accept message to the UE.

Figure 7:
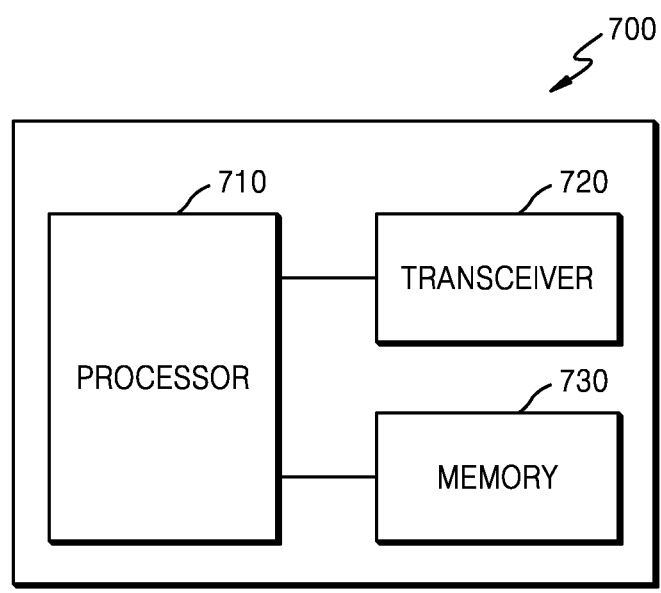
FIG. 7 illustrates a block diagram of user equipment (UE) according to embodiments of the present disclosure.

FIG. 7 illustrates a block diagram of a user equipment (UE) according to embodiments of the present disclosure.

Referring to the FIG. 7, the UE 700 may include a processor 710, a transceiver 720 and a memory 730. However, all of the illustrated components are not essential. The UE 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the provided function, process, and/or method. Operation of the UE 700 may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the UE 700. The memory 730 may be connected to the processor 710 and store at least one instruction or a protocol or a parameter for the provided function, process, and/or method. The memory 730 may include read-only memory (ROM) and/or random access memory (RAM) and/or hard disk and/or CD-ROM and/or DVD and/or other storage devices.

In an exemplary embodiment, the processor 710 may be configured to detect a steering of roaming (SOR) failure during registering with a first visitor-public land mobile network (VPLMN) or after registration with the first VPLMN, wherein the UE operates in a manual mode. Also, the processor 710 may be configured to switch the manual mode of the UE to an automatic mode based on a determination that the SOR failure occurs and perform PLMN selection procedure to obtain service on a second VPLMN which is a higher priority than the first VPLMN.

In an exemplary embodiment, if the first VPLMN is a PLMN which the SOR failure occurs, the first VPLMN may be considered as the lowest priority during performing the PLMN selection procedure.

In an exemplary embodiment, the UE 700 may be still registered on the first VPLMN where the SOR failure occurs upon switching the manual mode to an automatic mode.

In an exemplary embodiment, the PLMN selection procedure may be performed after an emergency PDU session is released in case the UE 700 has an established emergency PDU session.

In an exemplary embodiment, the processor 710 may be configured to receive, from the first VPLMN, a registration accept message which includes SOR information during registering with the first VPLMN.

In an exemplary embodiment, the SOR failure may be detected based on the registration accept message.

In an exemplary embodiment, wherein it may be determined that the SOR failure occurs in case that the SOR information is missing in the registration accept message or security check fails of the SOR information during registering with the first VPLMN.

In an exemplary embodiment, the processor 710 is configured to operate in an IDLE mode or RRC-INACTIVE mode before performing the PLMN selection procedure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
    detecting, in a manual mode, a steering of roaming (SOR) failure during registering with a first visitor-public land mobile network (VPLMN) or after a registration with the first VPLMN;
    switching the manual mode to an automatic mode;
    waiting until the UE moves to an idle state or radio resource control (RRC) inactive state; and
    performing, in the automatic mode, a PLMN selection procedure to obtain services from a second VPLMN which is a higher priority than the first VPLMN.

2. The method of claim 1, wherein, in case that the first VPLMN is determined as a PLMN where the SOR failure occurs, the first VPLMN is considered as a lowest priority during performing the PLMN selection procedure.

3. The method of claim 1, wherein the UE is still registered on the first VPLMN where the SOR failure occurs upon switching the manual mode to the automatic mode.

4. The method of claim 1, further comprising:
    receiving, from the first VPLMN, a registration accept message that includes SOR information during registering with the first VPLMN, and wherein the SOR failure is detected based on the registration accept message.

5. The method of claim 4, further comprising:
    determining that the SOR failure occurs in case that (i) the SOR information is missing in the registration accept message or (ii) a security check fails of the SOR information during registering with the first VPLMN.

6. A user equipment (UE), the UE comprising:
    a transceiver; and
    at least one processor coupled with the transceiver and configured to;
        detect, in a manual mode, a steering of roaming (SOR) failure during registering with a first visitor-public land mobile network (VPLMN) or after a registration with the first VPLMN;
        switch the manual mode to an automatic mode;
        wait until the UE moves to an idle state or radio resource control (RRC) inactive state; and
        perform, in the automatic mode, a PLMN selection procedure to obtain services from a second VPLMN which is a higher priority than the first VPLMN.

7. The UE of claim 6, wherein, in case that the first VPLMN is determined as a PLMN where the SOR failure occurs, the first VPLMN is considered as a lowest priority during performing the PLMN selection procedure.

8. The UE of claim 6, wherein the UE is still registered on the first VPLMN where the SOR failure occurs upon switching the manual mode to the automatic mode.

9. The UE of claim 6, wherein the at least one processor is further configured to: receive, from the first VPLMN, a registration accept message that includes SOR information during registering with the first VPLMN the SOR failure being detected based on the registration accept message.

10. The UE of claim 9, wherein the at least one processor is further configured to determine that the SOR failure occurs in case that (i) the SOR information is missing in the registration accept message or (ii) a security check fails of the SOR information during registering with the first VPLMN.

11. The method of claim 1, further comprising:
   identifying whether the UE has an established emergency protocol data unit (PDU) session.

12. The method of claim 11, wherein the PLMN selection procedure is performed after the established emergency PDU session is released in case that the UE has the established emergency PDU session.

13. The UE of claim 6, wherein the at least one processor is further configured to:
   identify whether the UE has an established emergency protocol data unit (PDU) session.

14. The UE of claim 13, wherein the PLMN selection procedure is performed after the established emergency PDU session is released in case that the UE has the established emergency PDU session.

\* \* \* \* \*